Figure 1:
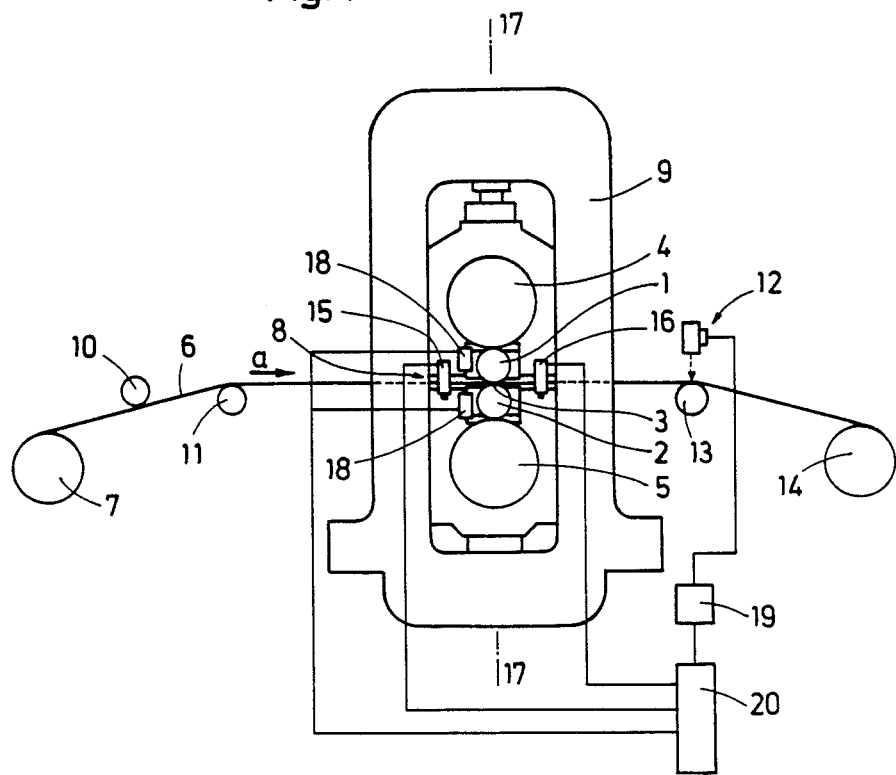

United States Patent [19]

Tröster et al.

[11] Patent Number: 4,836,680
[45] Date of Patent: Jun. 6, 1989

[54] FLATNESS MEASURING DEVICE FOR STRIP-SHAPED ROLLED MATERIAL

[76] Inventors: Josef Tröster, Kurfürst-Heinrich-Strasse 27, D-5960 Olpe; Axel Barten, Im Gensterfeld 20, D-5900 Siegen-Sohlbach, both of Fed. Rep. of Germany

[21] Appl. No.: 141,970

[22] Filed: Jan. 7, 1988

[30] Foreign Application Priority Data

Jan. 17, 1987 [DE] Fed. Rep. of Germany ....... 3701267

[51] Int. Cl.[4] .................... G01B 11/30; B21B 37/00
[52] U.S. Cl. .................... 356/371; 250/572; 356/431
[58] Field of Search ............... 356/371, 429, 430, 431; 250/563, 572

[56] References Cited

U.S. PATENT DOCUMENTS 3,574,469 4/1971 Emerson ............................. 356/431
4,110,047 8/1978 Takahashi ........................... 356/430

FOREIGN PATENT DOCUMENTS 2932602 2/1981 Fed. Rep. of Germany ...... 356/431
215399 11/1984 German Democratic Rep. .................................. 250/563

Primary Examiner—Richard A. Rosenberger
Attorney, Agent, or Firm—Young & Thompson

[57] ABSTRACT

A flatness measuring device for thin-gage strip in cold rolling mills comprises a rotating measuring roller (13) is arranged transversely to the strip travel direction (a) and across the strip width (b) and detects the rolled strip (6), with at least one surface groove (22) extending over the entire roller length (21), as well as a scanner (23) with one or more light beams (L4) for scanning strip waviness (24) that may occur over the upper section (31) of the surface groove (22) of the measuring roller (13) on account of a differing strip tension distribution over the strip width (b), which section (31) travels, on account of the rotational movement of the roller (13), over the entire length of the roller (13).

14 Claims, 2 Drawing Sheets

FLATNESS MEASURING DEVICE FOR STRIP-SHAPED ROLLED MATERIAL

The invention relates to a flatness measuring device for strip-shaped rolled material, especially thin-gage strip, in cold rolling mills.

The requirements to be met by dimensional and configurational accuracy of cold-rolled thin-gage strip have increased to a considerable extent during the course of the development of rolling technique and further processing. An ideal cold-rolled strip not only is to exhibit identical thickness over length and width but also is to lie completely flat. In this connection, flatness is to be preserved even if the strip is severed during further processing.

The flatness of a thin-gage strip is primarily influenced by the strip tension distribution over the strip width occurring during rolling. The characteristic variable for the flatness of a strip is represented by the length distribution $\Delta L/L$ over the strip width which can be calculated from the strip tensions measured over the strip cross section with the aid of the relationship $\Delta\delta/E$ wherein $\Delta\delta$ is the difference in tension between two neighboring strip zones and/or fibers, and E is the modulus of elasticity of the strip material.

The flatness measuring systems available commercially utilize measuring rollers, designed as guide rollers.

Such a measuring roller, known, for example, from "BBC-Nachrichten" [BBC News], vol. 11 (1980), consists of several measuring disks, juxtaposed in a row and rigged together by means of tie rods. The deflecting forces transmitted by the rolled strip act on rotating load transducers installed with high pretensioning in the individual measuring disks. The measuring disks of the flatness measuring roller are designed so that a low moment of inertia results in high dimensional stability. The transducers are staggered with respect to one another and are distributed uniformly over the surface of the measuring roller. Several load transducers, arranged in mutually offset relationship, can be connected as active measuring pickups to a single measuring amplifier common to all of them, up to eight measuring pickups being associated with one measuring amplifier. A microcomputer processes the measuring signals, correlating the measured values with the individual measuring elements, determining the relative deviation in length or the strip tensions, and displaying same on a screen.

The measured distribution of strip tension is a reflection of all influential variables acting on the shape of the roll gap, and thus on the reduction in the roll gap. The control takes over the task of adapting the influential variables to one another in such a way that a uniform reduction per pass results in the roll gap, and thus a constant distribution of the strip tension prevails in the exit.

The conventional flatness measuring roller is complicated and very expensive as a result of the technology involved, and this is due to the fact that all measuring elements are accommodated in the roller and consequently the measuring signals must be transmitted from the roller to the outside.

The invention is based on the object of developing a flatness measuring device for thin-gage strip which is distinguished over the known measuring rollers by a substantially simplified structural design.

The invention utilizes the waviness of the strip, occurring during the rolling of thin-gage strip on account of a nonuniform distribution of strip tensile stress over the strip width, which waviness is enhanced by the fact that the strip traveling over a guide or conveying roller has the possibility of deviating perpendicularly to the strip travel plane, as an optical indication for arising flaws in strip flatness which must be eliminated by regulating.

Figure 2:
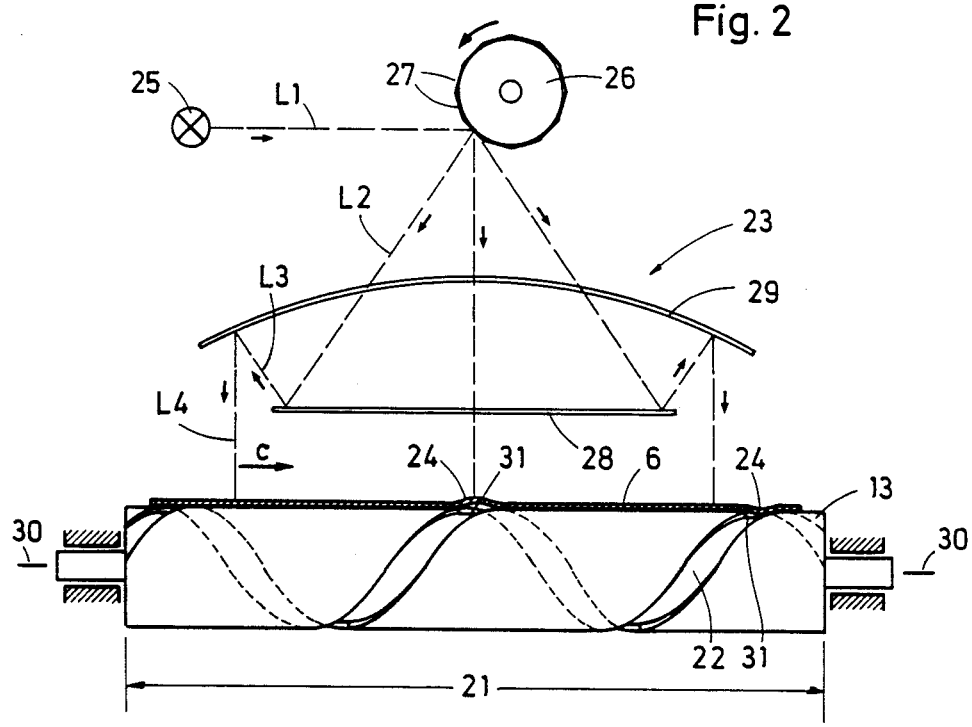
Figure 3:
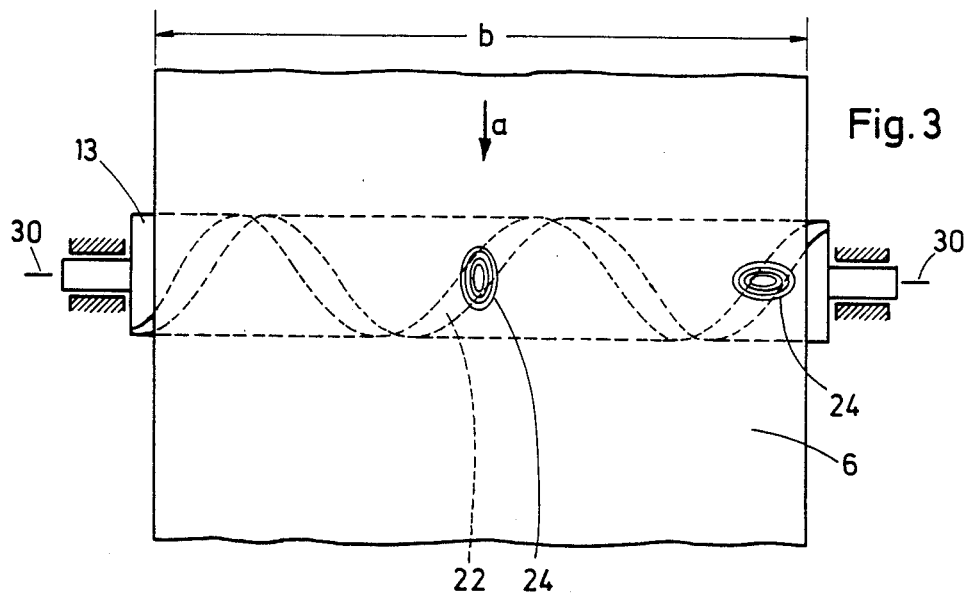

The invention will be described in greater detail below with reference to a flatness control system for a thin-gage strip four-high rolling mill, schematically illustrated in the drawing wherein:

FIG. 1 shows an operating diagram of a flatness and strip thickness control system, FIG. 2 is a front view of the flatness measuring device utilized in the control system, and FIG. 3 is a top view of the measuring roller of the measuring device according to FIG. 2.

The four-high rolling mill for rolling of thin-gage strip, of which in FIG. 1 only the set of rolls is shown which is installed in one rolling mill stand, for purposes of simplification, exhibits two work rolls (1, 2) forming the roll gap (3), as well as two backup rolls (4, 5). The strip (6) to be rolled is unwound from the uncoiler (7) and conducted via guide rollers (10, 11) arranged in the strip inlet (8) to the rolling mill stand (9) through the roll gap (3), as well as a measuring roller (13), installed downstream of the rolling mill stand (9), of a flatness measuring device (12), to the upcoiler (14).

The flatness measuring device (12) yields actuating signals for a control system for flatness and thickness of the rolled strip (6), this control system comprising, as the servo members, hydraulic cylinders (15, 16) for bending the work rolls (1, 2) and additional adjusting cylinders, not shown, for the mutual inclining of the work rolls (1, 2) in the plane (17-17) of the roll axes, as well as a roll cooling and lubricating unit (18) located upstream of the work rolls (1, 2). The adjusting signals of the flatness measuring device (12) are amplified by an amplifier (19) and processed in a computer (20).

The primary structural elements of the flatness measuring device (12) according to FIGS. 2 and 3 are the measuring roller (13) arranged transversely to the strip travel direction (a) and across the strip width (b), and detecting the rolled strip (6), this measuring roller being designed as a guide roller and exhibiting a surface groove (22) extending in a helical line over the entire roller length (21); as well as a scanner (23) with a laser beam (L4) for scanning strip wavinesses (24) that may occur due to a differing strip tension distribution over the strip width (b) in the area of the surface groove (22) of the measuring roller (13).

The light beam (L1) emitted by the laser (25) of the scanner (23) impinges on a reflector (27) arranged on the periphery of the rotating reflector wheel (26) and is reflected thereby as light beam (L2) to a planar deflecting mirror (28) reflecting a light beam (L3) to a concave mirror (29), from which the scanning laser beam (L4) impinges on the rolled strip (6) at a right angle to the longitudinal axis (30-30) of the measuring roller (13), in the zone of one of the respectively upper sections (31) of the surface groove (22) of the rotating measuring roller (13), these sections (31) traveling, due to the revolving motion of the roller (13), over the entire length (21) thereof. The light beam (L1) emanating from the laser (25) is guided, by means of the optical equipment of the scanner (23), as a scanning beam (L4) over the strip width (b) until it impinges on the next following reflector (27) of the rotating mirror wheel (26), effecting a renewed deflection of the light beam (L1) emanating from the laser (25) in the same direction so that the surface of the rolled strip (6) is continuously scanned in the same direction (c) over the strip width (b) by laser beams (L4) impinging perpendicularly to the longitudinal axis (30-30) of the measuring roller (13). The speeds of rotation of the measuring roller (13) and of the reflector wheel (26) of the scanner (23) are adapted to each other in such a way that the respectively upper groove section (31) of the measuring roller (13) and the laser beam (L4) impinging thereon travel in synchronism over the entire width (b) of the rolled strip (6).

The light reflected from the surface of the rolled strip (6) is collected in one or several receivers, not shown, pertaining to the scanner (23), and converted into an electrical signal. Changes in the amplitude as well as angular distribution of the received light flux, on account of a waviness (24) of the rolled strip (6), triggered by a nonuniform strip tension distribution over the strip width (b), generate an electrical pulse that is evaluated as an error signal by the computer (20) of the flatness control system.

If, in case of rolling thin-gage strips having a large strip width (b), the latter cannot be fully covered by the scanning beam (L4) of a scanner (23) then there is the possibility to mount several scanners in a straight line above the measuring roller (13).

In a modification of the aforedescribed embodiment, the measuring roller (13), designed as a steel roller, can exhibit a synthetic resin coating with a machined-in, helical-line-shaped groove (22); and, to avoid damage to the rolled strip (6) by sharp edges of the superficial groove (22) of the measuring roller (13), a soft material, such as rubber or the like, can be applied to the groove by vulcanizing and/or cementing.

We claim:

1. Flatness measuring device for strip-shaped rolled material in cold rolling mills, comprising a measuring roller (13) arranged transversely to the strip travel direction (a) and across the strip width (b), and detecting the rolled strip (6), this measuring roller having at least one surface groove (22) extending over the entire roller length (21), as well as a scanner (23) with a light beam (L4) for scanning strip wavinesses (24) that may occur in the strip that overlies the surface groove (22) of the measuring roller (13) on account of a differing strip tension distribution over the strip width (b).

2. Measuring device according to claim 1, characterized by a design of the surface groove (22) of the measuring roller (13) in the shape of a helical line, as well as by continuous scanning of the rolled strip (6) over the strip width (b) in the zone of one or several sections of the respectively upper sections (31) of the surface groove (22) of the rotating measuring roller (13), which sections (31) travel, on account of the rotational movement of the roller (13), over the entire length of the roller, the light beam of the scanner (23) being arranged above the measuring roller (13), the scanning speed of the light beam traveling transversely to the strip travel direction (a) and the rotating speed of the measuring roller (13) being adapted to each other in such a way that the upper groove section (31) of the measuring roller (13) and the light beam (L4) impinging thereon move in synchronism over the entire width (b) of the rolled strip (6).

3. Measuring device according to claim 2, characterized in that the helical-line-shaped groove (22) is machined directly into the outer jacket of the measuring roller (13), said roller (13) being a steel roller.

4. Measuring device according to claim 3, characterized in that a soft material is secured in the surface groove (22).

5. Measuring device according to claim 1, characterized in that the measuring roller (13) is a steel roller and has a synthetic resin coating with a groove (22) of a helical-line shape that is machined therein.

6. Measuring device according to claim 1, characterized in that the measuring roller (13) is fashioned as a guide roller.

7. Measuring device according to claim 1, characterized in that the measuring roller (13) is driven by a motor.

8. Flatness measuring device for thin-gage strip in cold rolling mills, comprising a rotating measuring roller (13) arranged transversely to the strip travel direction (a) and across the strip width (b), and detecting the rolled strip (6), this measuring roller having at least one surface groove (22) extending over the entire roller length (21), as well as a scanner (23) with at least one light beam (L4) for scanning strip wavinesses (24) that may occur in the zone of at least one section of the upper section (31) of the surface groove (22) of the measuring roller (13) on account of a differing strip tension distribution over the strip width (b), which section (31) travels over the entire roller length (21).

9. Measuring device according to claim 8, the surface groove (22) of the measuring roller (13) being helical, the light beam (L4) of the scanner (23) being arranged above the measuring roller (13), the scanning speed of the light beam (L4) traveling transversely to the strip travel direction (a) and the rotating speed of the measuring roller (13) being adapted to each other in such a way that the upper groove section (31) of the measuring roller (13) and the light beam (L4) impinging thereon move in synchronism over the entire width (b) of the rolled strip (6).

10. Measuring device according to claim 9, in which the helical-line-shaped groove (22) is machined directly into the outer jacket of the measuring roller (13), which roller is a steel roller.

11. Measuring device according to claim 8, in which the measuring roller (13) is a steel roller and has a synthetic resin coating with a groove (22) of a helical-line shape that is machined in said resin.

12. Measuring device according to claim 8, in which a soft material is provided in the surface groove (22).

13. Measuring device according to claim 8, in which the measuring roller (13) is a guide roller.

14. Measuring device according to claim 8, in which the measuring roller (13) is driven by a motor.

* * * * *